Sept. 15, 1970  F. X. EISELE  3,529,118

PORTABLE SPOT WELDING HANDPIECE

Filed March 22, 1968

Franz X. Eisele,
INVENTOR.

BY.

ALLEN A. DICKE,
AGENT.

United States Patent Office 3,529,118
Patented Sept. 15, 1970

3,529,118
PORTABLE SPOT WELDING HANDPIECE
Franz X. Eisele, Oceanside, Calif., assignor to Hughes Aircraft Company, Culver City, Calif., a corporation of Delaware
Filed Mar. 22, 1968, Ser. No. 715,259
Int. Cl. B23k 9/28
U.S. Cl. 219—90                                    4 Claims

ABSTRACT OF THE DISCLOSURE

The portable spot welding handpiece has a fixed and a movable electrode holder. The movable electrode holder is moved from an open position away from the fixed electrode holder, toward the fixed electrode holder by operation of an external operating handle. The interconnection between the operating handle and the movable electrode holder provides a mechanical advantage so that the interelectrode force can exceed the operating handle force. Internal switch means signals for start of the weld cycle when interelectrode force has reached a predetermined value. This is controlled by adjustable resilient means between the operating handle and the movable electrode holder.

BACKGROUND

This invention is directed to portable spot welding handpieces, and particularly handpieces which can be moved to the spot welding job, apply a predetermined force between the spot welding electrodes and signal the start of the welding cycle.

The prior art spot welding devices are for the most part permanent installations wherein a fixed platen is opposed by a movable electrode. The movable electrode in the larger size devices is powered by an air cylinder or the like. In the lighter devices, it is sometimes moved toward the fixed electrode by means of a foot pedal. In adapting these prior art devices to the known portable spot welding handpieces, the well known structure has been carried along. Here, the manual handle for bringing the movable against the fixed electrode is directly connected so that it becomes burdensome to manually reach the desired interelectrode force. This is because, despite the fact that electrodes are smaller in such portable handpieces, and the metals are usually thinner, requiring less interelectrode force, the direct graps required around the handpiece against its manually operated lever becomes tiresome when much repetitive spot welding is to be done. Thus, such portable spot welding handpieces have not been entirely successful.

SUMMARY

In order to aid the understanding of this invention, it can be stated in essentially summary form that it is directed to portable spot welding handpiece which has a machanical advantage between the operating lever and the closure of the electrodes. This mechanical advantage is accomplished by the use of suitable linkage therebetween so that a larger interelectrode force results at the electrode faces than is applied to the operating handle.

Accordingly, it is an object of this invention to provide a portable spot welding handpiece which applies more force to the spot welding electrode faces than as applied to the manually operable operating handle on the handpiece. It is another object of this invention to provide a portable spot welding handpiece which has therein adjustable resilient means which controls and limits the force applied to the spot welding electrodes at the point where spot welding current is applied. It is another object to provide adjustability of the force applied to the spot welding electrodes, and adjustability of the presure level at which the handpiece signals for spot welding current. It is a further object to provide a spot welding handpiece which can easily be operated over a prolonged period of time without fatigue resulting due to excessive handpiece operating force. Other objects and advantages of this invention will become apparent from a study of the following portions of the specification, the claims and the attached drawings.

DESCRIPTION OF THE PREFERRED EMBODIMENT

Figure 1:
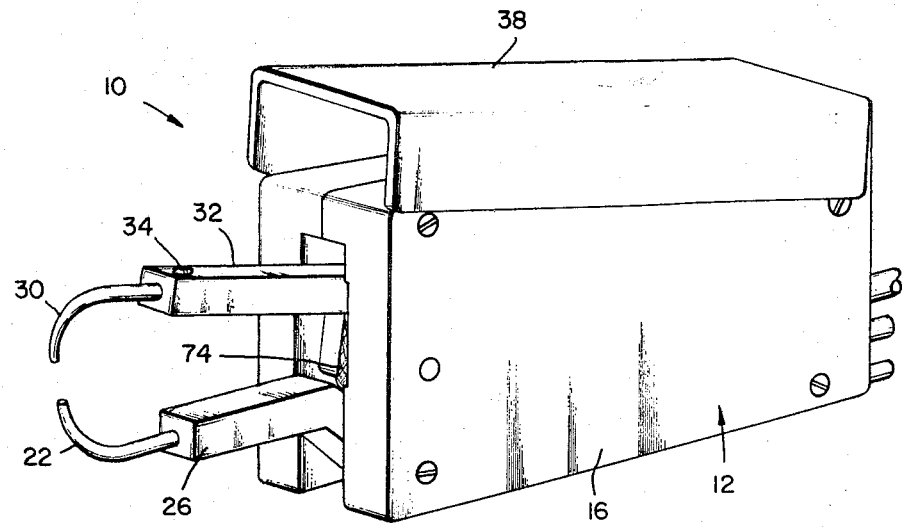
FIG. 1 is an isometric view showing the portable spot welding handpiece of this invention.
Figure 2:
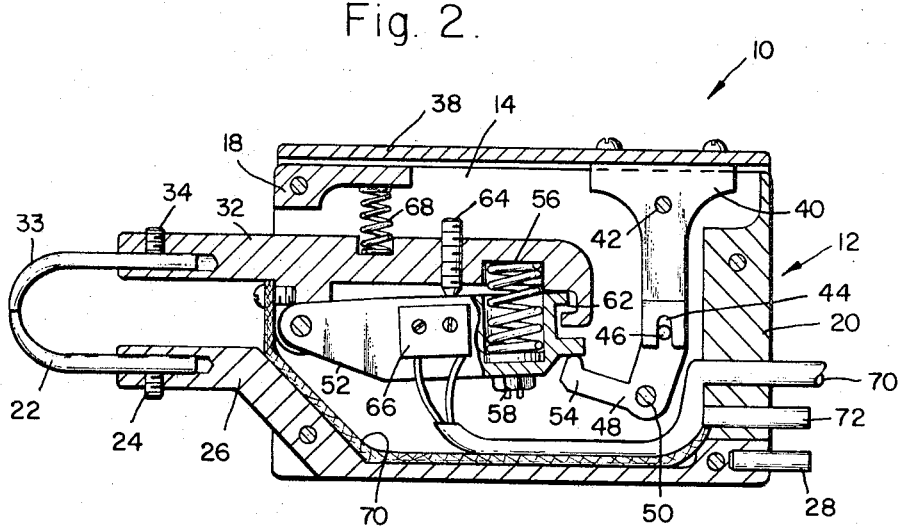
FIG. 2 is a longitudinal section through the portable spot welding handpiece with parts broken away.

The portable spot welding handpiece of this invention is generally indicated at 10. Handpiece 10 has body 12 which is formed of side plates 14 and 16 separated by spacers 18 and 20.

Spacer 20 extends out of the front of handpiece 10 to carry electrode 22 therein. The electrode is removable and replaceable, and is secured in place by set screw 24. Electrode 22 is referred to as the fixed electrode, for it is fixed with respect to the remainder of body 12. Spacer 20 extends out of the front of the handpiece, from between the side plates 14 and 16 to form electrode holder 26, in which electrode 22 is secured. The electrode holder may be of any convenient shape to extend forward and permit the electrode 22 to be guided into position. Pin 28 is provided at the rear of spacer 20 to serve as an electrical connection for electrode 22.

Movable electrode 30 is secured in electrode holder 32 by means of said screw 34. It is removable and replaceable so that new electrodes can be installed, which electrodes can be of any reasonable configuration to reach the parts to be spot welded. Electrode holder 32 is movable, and is pivoted upon pivot pin 36 so that movable electrode 30 can be brought into contact or proximity with fixed electrode 22.

Manually operable handle 38 is pivotally mounted on the top of handpiece 10. Lever 40 carries handle 38 thereon, and lever 40 is pivoted on pivot pin 42 which extends between the side plates of the body. Lever 40 is bifurcated at its lower end to provide slot 44. Pin 46 is mounted upon bellcrank 48 and rests within slot 44. Bellcrank 48 is pivoted at 50 so that the bellcrank rotates about its pivot 50 upon motion of handle 38.

Operating lever 52 is pivoted at 36, and is contacted on its under side by leg 54 of bellcrank 48. Operating level 52 is interconnected in three ways with movable electrode holder 32. First, compression spring 56 urges them apart. Spring force is adjusted by screw 58 which engages under a movable plunger in the spring pocket which acts as a spring seat. Secondly, flange 60 engages in slot 62 so that the relative angular motion between the two is limited. Spring 56 urges flange 60 toward the bottom of slot 62 while force applied by handle 38 through bellcrank 48 urges the flange 60 toward the top of the slot. Thirdly, switch operating screw 64 is threadedly engaged in movable electrode holder 32 and faces switch 66 which is mounted on operating lever 52. Screw 64 is adjusted so that switch 66 is actuated just before flange 60 strikes the top of slot 62, and so that switch 66 is unactuated when flange 60 is toward the bottom of slot 62. Compression spring 68 is positioned between spacer 18 and movable electrode holder 32 to urge the movable electrode holder to rotate in the clockwise direction, thus transmitting force through operating lever 52 and bellcrank 48 to raise handle 38 away from spacer 18. This motion also moves movable electrode 30 away from fixed electrode 22, to the position shown in FIG. 1.

Electric leads 70 are connected to switch 66, and are also connected to the weld cycle controller. They indicate to the weld cycle controller that the electrodes 22 and 30 are closed around a workpiece, and the proper electrode force has been applied for completion of a proper weld. The weld cycle controller thereupon emits appropriate current, which is connected to pin 72 for conduction through lead 74 which is connected to movable electrode holder 32.

In operation, handpiece 10 is connected by the indicated leads to an appropriate weld cycle controller. The handpiece is then brought to a workpiece which is to be spot welded. The electrodes 22 and 30 are positioned at the spot weld point, and the electrodes are closed by manual force upon handle 38. In view of the fact that pin 46 is twice as far from pivot 42 as from pivot 50, a 2:1 mechanical advantage ensues so that operation of the handle causes twice as much force to be applied to the movable electrode as is applied to the handle. Such handle motion causes rocking of bellcrank 48 in the clockwise direction which first closes the electrodes upon the workpiece and then compresses spring 56. The amount of compressive force of spring 56 determines the amount of electrode force applied. When the spring has been compressed a sufficient distance to move flange 60 toward the upper part of slot 62, switch 66 is actuated by switch operating screw 64. This causes the weld cycle controller to cycle, passing current from pin 72 and lead 74 through movable electrode 30, fixed electrode 22 and back to the weld cycle controller through pin 28. The welding current flow continues under the control of the weld cycle controller until the spot weld is completed.

Thereupon, manual handle 38 is released, the electrode 30 moves away from the workpiece and away from electrode 22 and the handpiece 10 is repositioned for another weld. By this means a large number of welds can be accomplished in a single day and by an operator, without undue fatigue, because of the mechanical advantage built into the internal linkage of the handpiece. Additionally, damage to switch 66 is prevented by the contact of flange 60 with the top of slot 62, which contacts occur immediately after operation of switch 66 and without substantial overtravel of the switch.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A portable spot welding handpiece, said portable spot welding handpiece comprising:
   a body;
   a fixed electrode holder mounted on said body;
   a movable electrode holder movably mounted on said body;
   a manually operable handle pivotally mounted on said body;
   spring means mounted on said body and against said movable electrode holder to urge said movable electrode holder away from said fixed electrode holder and to move said handle away from said body;
   said movable handle being mounted upon a lever, said lever being pivoted to said body;
   a bellcrank pivotally mounted on said body;
   first interconnection means interconnecting said handle so that rotary motion of said handle about its pivot causes rotary motion of said bellcrank about its pivot;
   second interconnection means interconnecting said bellcrank and said movable electrode holder to rotate said movable electrode holder about its pivot when said bellcrank rotates on its pivot, said interconnection means interconnecting said handle and said movable electrode holder so that handle motion causes movable electrode holder motion lesser than handle motion.

2. The portable spot welding handpiece of claim 1 wherein:
   an operating lever is pivoted in said body substantially on the pivot point of said movable electrode, said operating lever inter-engaging with said movable electrode for limited motion with respect thereto;
   said inter-engagement means including stop means limiting motion of said operating lever toward said movable electrode holder, resilient means urging said operating lever away from said electrode holder; and
   said bellcrank engaging said operating lever to urge said operating lever toward said movable electrode holder against the urging of said spring.

3. The portable spot welding handpiece of claim 2 further including:
   a switch mounted on said operating lever and a switch operator mounted on said movable electrode holder, said switch being actuated by said switch operator when said operating lever moves toward said movable electrode holder.

4. A portable spot welding handpiece, said portable spot welding handpiece comprising:
   a body, a fixed electrode holder mounted on said body, a movable electrode holder pivotally mounted on said body so that electrodes mounted in said electrode holders can move toward and away from each other, a spring between said body and said movable electrode holder to urge electrodes mounted in said electrode holders away from each other;
   an operating lever movably mounted in said body and inter-engaging with said movable electrode holder, said inter-engagement including stop means on said operating lever and on said movable electrode holder to limit the motion of said operating lever toward said movable electrode holder;
   resilient means urging said operating lever away from said movable electrode holder;
   manually operable handle means mounted on said body and being connected to said operating lever for increased mechanical advantage so that force applied to said manually operable handle means toward said body causes greater force between electrodes mounted in said electrode holders than applied to said handle and causes motion of said operating lever toward said movable electrode holder; and
   switch means and switch operating means mounted upon said operating lever and on said movable electrode holder, said switch means and said switch operating means being arranged so that said switch is operated by said switch operating means before said stop means on said operating lever and said movable electrode holders stop motion of said operating lever toward said movable electrode holder.

References Cited

UNITED STATES PATENTS

| | | | |
|---|---|---|---|
| 3,445,618 | 5/1969 | Blurton | 219—90 |
| 2,517,653 | 8/1950 | Gaston | 219—90 |
| 2,535,946 | 12/1950 | Mulder | 219—90 |
| 2,651,701 | 9/1953 | Backen | 219—90 |
| 2,961,527 | 11/1960 | Tortorela | 219—90 |

JOSEPH V. TRUHE, Primary Examiner

L. H. BENDER, Assistant Examiner

FO-1050
(5/69)

UNITED STATES PATENT OFFICE
CERTIFICATE OF CORRECTION

Patent No. 3,529,118    Dated September 15, 1970

Inventor(s) Franz X. Eisele

It is certified that error appears in the above-identified patent and that said Letters Patent are hereby corrected as shown below:

Column 3, line 67, after "handle", insert --and said bellcrank--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents

AAD:lej